United States Patent [19]
Matsuoka

[11] Patent Number: 6,035,989
[45] Date of Patent: Mar. 14, 2000

[54] CLUTCH-ACTUATED PISTON STRUCTURE

[75] Inventor: Yoshihiro Matsuoka, Neyagawa, Japan

[73] Assignee: Exedy Corporation, Osaka, Japan

[21] Appl. No.: 09/120,322

[22] Filed: Jul. 22, 1998

[30] Foreign Application Priority Data

Jul. 24, 1997 [JP] Japan ...................................... 9-198397

[51] Int. Cl.[7] .............................................. F16D 25/0638
[52] U.S. Cl. .................................. 192/85 AA; 192/106 F; 192/109 F
[58] Field of Search ................................ 192/3.26, 52.4, 192/85 AA, 109 F, 106 F

[56] References Cited

U.S. PATENT DOCUMENTS

| | | | |
|---|---|---|---|
| 2,642,844 | 6/1953 | Flinn ..................................... | 192/106 F |
| 2,916,122 | 12/1959 | Hindmarch ........................... | 192/106 F |
| 4,147,245 | 4/1979 | Folomin et al. ...................... | 192/106 F |
| 4,186,829 | 2/1980 | Schneider et al. .................. | 192/85 AA |
| 4,266,648 | 5/1981 | Martin ................................. | 192/85 AA |
| 4,361,217 | 11/1982 | Bieber et al. ....................... | 192/85 AA |
| 4,713,984 | 12/1987 | Ohkubo ............................... | 192/85 AA |

*Primary Examiner*—Rodney H. Bonck
*Attorney, Agent, or Firm*—Shinjyu Global Ip Counselors, LLP

[57] ABSTRACT

A clutch-actuated piston structure is provided for engaging and releasing a clutch engaging member 23 of a power disconnecting clutch 9. The clutch-actuated piston structure is especially useful in a torque converter. The clutch-actuated piston structure is powered by hydraulic oil from the torque converter or other device. The hydraulic oil is discharged from the torque converter through one or more oil paths 47. The clutch-actuated piston structure has a piston 25 movably coupled to a hydraulic chamber structural member 26. The piston 25 and the hydraulic chamber structural member 26 form therebetween a first hydraulic chamber A and a second hydraulic chamber B. The first hydraulic chamber A receives the hydraulic oil from the torque converter or other device. The second hydraulic chamber B is connected to the first hydraulic chamber A via a diaphragm D, which restricts the flow of hydraulic oil from the first hydraulic chamber A to the second hydraulic chamber B. Preferably, the piston 25 is disposed adjacent to the clutch engaging member 23 of the power disconnecting clutch 9 for moving against and away from the clutch engaging member 23. One or more oil paths 61, 81 connect the second hydraulic chamber B to the exhaust port of the torque converter. One or more opening/closing members 64, 84 are disposed in the oil paths 61, 81. One or more opening/closing members 64, 84 are movable between a first position connecting the second hydraulic chamber B to the exhaust port and a second position disconnecting the second hydraulic chamber B from the exhaust port.

12 Claims, 7 Drawing Sheets

CLUTCH-ACTUATED PISTON STRUCTURE

BACKGROUND OF THE INVENTION

1. Field of the Invention

This invention generally relates to a clutch actuated piston structure. More specifically, the present invention relates to a clutch actuated piston structure, which moves a piston by hydraulic oil to selectively engage and release a clutch engaging member. The clutch actuated piston structure is especially useful in a torque converter.

2. Background Information

Multi-disk clutches are often used in the transmissions of vehicles. Multi-disk clutches typically have a piston for engaging and releasing a clutch engaging member. In addition, a hydraulic chamber constructed from the piston and the hydraulic chamber structural member is disposed on the side opposite the clutch engaging member of the piston. When the hydraulic oil pressure is applied to the hydraulic chamber, the piston overcomes the driving force of a return spring to move towards the clutch engaging member and engage the clutch. When the application of hydraulic oil pressure to the hydraulic chamber is stopped, the piston returns to a given position by the driving force of the return spring and releases the clutch engaging member.

A check ball mechanism is sometimes provided in the multi-disk clutch as a hydraulic oil pressure exhaust mechanism, which releases the hydraulic oil pressure in the hydraulic chamber during movement of the piston to a clutch release position. The check ball mechanism typically includes an exhaust hole formed on the clutch side of the piston, a large-diameter hole formed on the hydraulic chamber side of the piston and passing through the exhaust hole, and a check ball disposed inside the large-diameter hole. The check ball can move between a first opened position where it is removed from the exhaust hole and a second closed position where it closes the exhaust hole. When working pressure is supplied to the hydraulic chamber, the check ball moves from the first opened position to the second closed position to cover the exhaust hole. Consequently, a large hydraulic oil pressure is produced in the hydraulic chamber. When working pressure is no longer provided in the hydraulic chamber, the check ball moves back to the first opened position by centrifugal force to uncover the exhaust hole. Thus, the hydraulic oil of the hydraulic chamber escapes through the exhaust port, and the piston is rapidly separated from the clutch engaging member.

When the flow rate of the hydraulic oil supplied to the hydraulic chamber is constant, the moving speed of the piston towards the clutch engaging member side, when the clutch is being engaged, is determined by the volume of the hydraulic chamber. Namely, if the volume of the hydraulic chamber is too large, the moving speed of the piston to the clutch engaging becomes slower. Therefore, starting the transmission torque of the clutch engaging member becomes slower.

Since the check ball is moved by centrifugal force, the action can be unstable. Therefore, the flow path area of the exhaust hole sometimes is not sufficiently guaranteed during the clutch release action. In addition, since the check ball is used, the exhaust hole cannot be too large. The reason the exhaust hole cannot be too large is that a very small part of the check ball covers the exhaust hole. Unfortunately, if the exhaust hole only becomes slightly larger, the check ball will become extremely large. Given the above results, the hydraulic oil pressure in the hydraulic chamber does not adequately escape during piston operation when the clutch is released. In this case, the return action of the piston becomes slower.

In view of the above, there exists a need for a clutch actuated piston structure which overcomes the problems in the prior art devices. This invention addresses these needs in the prior art as well as other needs, which will become apparent to those skilled in the art from this disclosure.

SUMMARY OF THE INVENTION

An object of the present invention is to provide a clutch actuated piston structure having excellent responsiveness by a piston actuated by hydraulic oil.

The clutch-actuated piston structure of the present invention has structure capable of engaging by hydraulic oil and releasing the clutch engaging member by discharging the hydraulic oil through an exhaust port. The clutch-actuated piston structure of the present invention preferably comprises a piston and a hydraulic chamber structural member. The piston is disposed adjacent to the clutch engaging member and can move close to and away from the clutch engaging member. The piston and the hydraulic chamber structural member form a first hydraulic chamber therebetween and a second hydraulic chamber therebetween. The first hydraulic chamber is supplied with hydraulic oil, which passes through the diaphragm from the first hydraulic chamber to the second hydraulic chamber.

In this clutch-actuated piston structure of the present invention, when hydraulic oil is supplied to the first hydraulic chamber, the piston starts to move towards the clutch engaging member. During movement of the piston, the flow of hydraulic oil from the first hydraulic chamber to the second hydraulic chamber is regulated by the diaphragm. Therefore, the piston is primarily actuated by the hydraulic oil being supplied to the first hydraulic chamber. When the piston comes into contact with the clutch engaging member, the hydraulic oil flows through the diaphragm from the first hydraulic chamber to the second hydraulic chamber.

As described above, by dividing the hydraulic chamber into a first hydraulic chamber and a second hydraulic chamber with a diaphragm between the two hydraulic chambers, only the first hydraulic chamber functions as the hydraulic chamber for moving the piston. Since the volume of the first hydraulic chamber for moving the piston in this manner is small compared to a conventional hydraulic chamber, the moving speed of the piston becomes faster. As a result, starting the transmission torque in the clutch engaging member is rapid.

In the clutch-actuated piston structure of the present invention, the piston and hydraulic chamber structural member each have annular surfaces or walls, which are close to each other. The first hydraulic chamber and the second hydraulic chamber are the concentric annular spaces divided by the annular surfaces or walls. The clutch-actuated piston structure also has the diaphragm or other annular sealing member disposed between the annular surfaces for restricting the amount of hydraulic oil flowing from the first hydraulic chamber to the second hydraulic chamber. Since the diaphragm is constructed from the annular sealing member provided in the annular surfaces, which are close to each other, the structures of the first and second hydraulic chambers are quite simple.

In accordance with another aspect of the present invention, the clutch-actuated piston structure of the present invention comprises a first hydraulic chamber, an opening/closing member, and an actuating mechanism for the opening/closing member. A first oil path connects the second hydraulic chamber to the exhaust port. The opening/closing member is disposed in the first oil path and can move between the connection position where the second hydraulic chamber is connected to the exhaust port and the disconnection position where the second hydraulic chamber and the exhaust port are disconnected. The actuating mechanism positions the opening/closing member at the connection position when the piston moves away from the hydraulic chamber structural member towards the clutch engaging member, and positions the opening/closing member at the disconnection position when the piston comes into contact with the clutch engaging member.

In the clutch-actuated piston structure of the present invention, the opening/closing member is positioned at the connection position when the piston moves to the clutch engaging member side, and connects the second hydraulic chamber to the exhaust port. Namely, the second hydraulic chamber connects to the outside and prevents a negative pressure state from occurring. As a result, the speed at which the piston moves becomes faster. When the piston comes into contact with the clutch engaging member, the opening/closing member subsequently moves to disconnect the first oil path. In this position, a large hydraulic oil pressure is then produced in the second hydraulic chamber.

The clutch-actuated piston structure of the present invention can further comprise the first oil path, the opening/closing member, the drive member, and a second oil path. The first oil path connects the second hydraulic chamber to the exhaust port. The opening/closing member is disposed within the first oil path for movement between a first position that connects the second hydraulic chamber to the exhaust port and the second position that disconnects the second hydraulic chamber from the exhaust port. The drive member is the member that holds the opening/closing member at the first position. The second oil path is connected to the first hydraulic chamber, and is the path for moving the opening/closing member from the first position to the second position against the driving force of the drive member by the hydraulic oil supplied to the first hydraulic chamber.

When the hydraulic oil pressure is applied to the first hydraulic chamber and the hydraulic oil is supplied to the second oil path, the opening/closing member is moved to the second position. Therefore, the first oil path connecting the second hydraulic chamber and the exhaust port is disconnected. When the hydraulic oil pressure is no longer applied to the first hydraulic chamber, by using its driving force, the drive member moves the opening/closing member to the first position. Therefore, the second hydraulic chamber connects to the exhaust port through the first oil path, and the hydraulic oil pressure in the second hydraulic chamber escapes through the exhaust port.

Since the opening/closing member is operated by the hydraulic oil pressure in the second oil path, the opening and closing actions of the first oil path are quite stable. Consequently, the hydraulic oil pressure in the second hydraulic chamber can reliably escape during movement of the piston to the clutch released position. As a result, the piston return action becomes faster.

As mentioned above, the clutch-actuated piston structure of the present invention is a structure capable of engaging by the hydraulic oil and releasing the clutch by discharging the hydraulic oil through the exhaust port. In accordance with another embodiment of the present invention, the clutch-actuated piston structure comprises a piston, a hydraulic chamber, an oil path, an opening/closing member, a drive member, and a pressure differential generation mechanism. The piston is disposed adjacent to the clutch and can move close to and away from the clutch. The hydraulic chamber is disposed on the side opposite of the piston. The hydraulic chamber is supplied hydraulic oil and has an exhaust for discharging the hydraulic oil. The oil path connects the hydraulic chamber to the exhaust port. The opening/closing member is disposed in the oil path and can move between a first opened position for connecting the hydraulic chamber to the exhaust port and a second closed position for disconnecting the hydraulic chamber from the exhaust port. The drive member is the member for holding the opening/closing member at the first opened position. The pressure differential generation mechanism is the mechanism for generating a pressure difference on both sides of the opening/closing member when hydraulic oil was supplied to the hydraulic chamber. The pressure generation mechanism moves the opening/closing member from the first opened position to the second closed position against the driving force from the drive member.

When the hydraulic oil pressure is applied to the hydraulic chamber, the differential pressure generation mechanism generates the pressure difference on both sides of the opening/closing member, causing the opening/closing member to move from the first opened position to the second closed position. Therefore, the oil path connecting the hydraulic chamber to the exhaust port is disconnected. When the hydraulic oil pressure is no longer applied to the hydraulic chamber, by using its driving force, the drive member moves the opening/closing member to the first position. Therefore, the hydraulic chamber connects through the oil path to the exhaust port, and the hydraulic oil pressure in the hydraulic chamber escapes through the exhaust port.

Since the opening/closing member is operated by the hydraulic oil pressure generated by the pressure differential generation mechanism, the opening and closing actions of the oil path are quite stable. Therefore, the hydraulic oil pressure in the hydraulic chamber can reliably escape during the piston release action when the clutch is released. As a result, the return action of the piston becomes faster.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
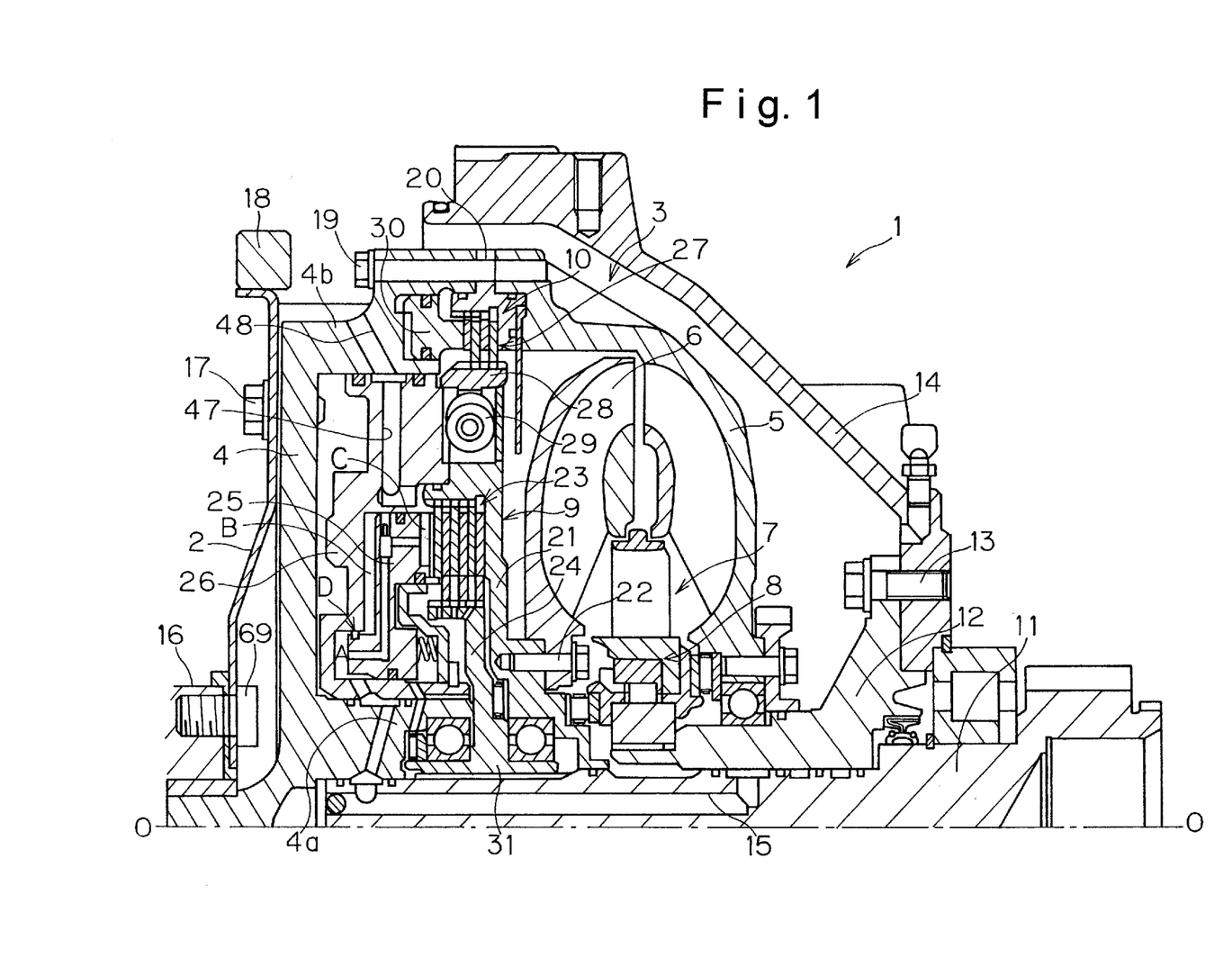
FIG. 1 is a partial cross-sectional schematic view of a torque converter using a clutch-actuated piston structure in accordance with one the embodiment of the present invention.

Referring initially to FIG. 1, a torque converter 1 is illustrated in accordance with one embodiment of the present invention. Line O—O represents the axis of rotation of the torque converter 1. The torque converter 1 is adapted to be disposed between an engine (not shown) and a manual transmission (not shown) of a vehicle. The torque converter 1 is an apparatus, which transmits the torque from the engine to the transmission. Specifically, the torque converter 1 transmits the torque from the crankshaft 16 of the engine to the main drive shaft 11 of the transmission.

The torque converter 1 is primarily constructed from the torque converter body 3. The torque converter body 3 is connected through the drive plate 2 to the crankshaft 16. The drive plate 2 is a thin, disk-shaped member, which is rigid coupled between the torque converter body 3 and the crankshaft 16 in the direction of rotation. The drive plate 2 can bend in the bending direction, i.e., in a substantially axial direction. The drive plate 2 is the member, which absorbs and isolates the vibrations transmitted from the engine to the torque converter body 3 in the bending direction. The inner periphery of the drive plate 2 is fixedly coupled to the crankshaft 16 by a plurality of crank bolts 69. The outer periphery of the drive plate 2 is fixedly coupled to the torque converter body 3 by a plurality of bolts 17. An annular inertia member 18 is fixedly coupled to the outer peripheral edge of the drive plate 2.

In the torque converter body 3, the annular hydraulic chamber is formed between the front cover 4 and the shell of the impeller 5. The front cover 4 is an annular member disposed on the engine side of the torque converter body 3. The outer periphery of the front cover 4 is fixedly coupled to the drive plate 2 as described earlier by a plurality of bolts 17. The front cover 4 has a tubular projection 4a on the inner peripheral portion and a tubular projection 4b on the outer peripheral portion. The projections 4a and 4b are formed on the axially facing surface of the front cover 4, which faces the transmission. The projections 4a and 4b extend outwardly and axially from the transmission side of the front cover 4.

The outer periphery of the shell of the impeller 5 is fixedly coupled to the projection 4b on the outer peripheral side of the front cover 4 by a plurality of bolts 19. A plurality of plates or blades is disposed inside the hydraulic chamber of the shell of the impeller 5. The turbine 6 is disposed at the position opposite the impeller 5. The turbine 6 includes a turbine shell and a plurality of plates or blades fixed to the turbine shell. The turbine 6 will transmit the torque to the power disconnecting clutch 9, which will be described later. The stator 7 is disposed in the interior between the impeller 5 and the turbine 6. The stator 7 is attached to the fixed shaft 12 through a one-way clutch 8. The fixed shaft 12 is fixedly coupled to the wall of the transmission via bolts 13. In addition, the cover 14 is an annular member, which overlies the transmission side of the torque converter body 3. The outer periphery of the torque converter body 3 is fixed to the transmission wall by a plurality of bolts (not shown).

The power disconnecting clutch 9 and the lock-up clutch 10 are disposed in the space between the front cover 4 and the turbine 6. The power disconnecting clutch 9 is the clutch, which transmits or disconnects the torque from the turbine 6 to the main drive shaft 11. The lock-up clutch 10 is the clutch, which directly transmits the torque from the front cover 4 to the power disconnecting clutch 9.

Figure 2:
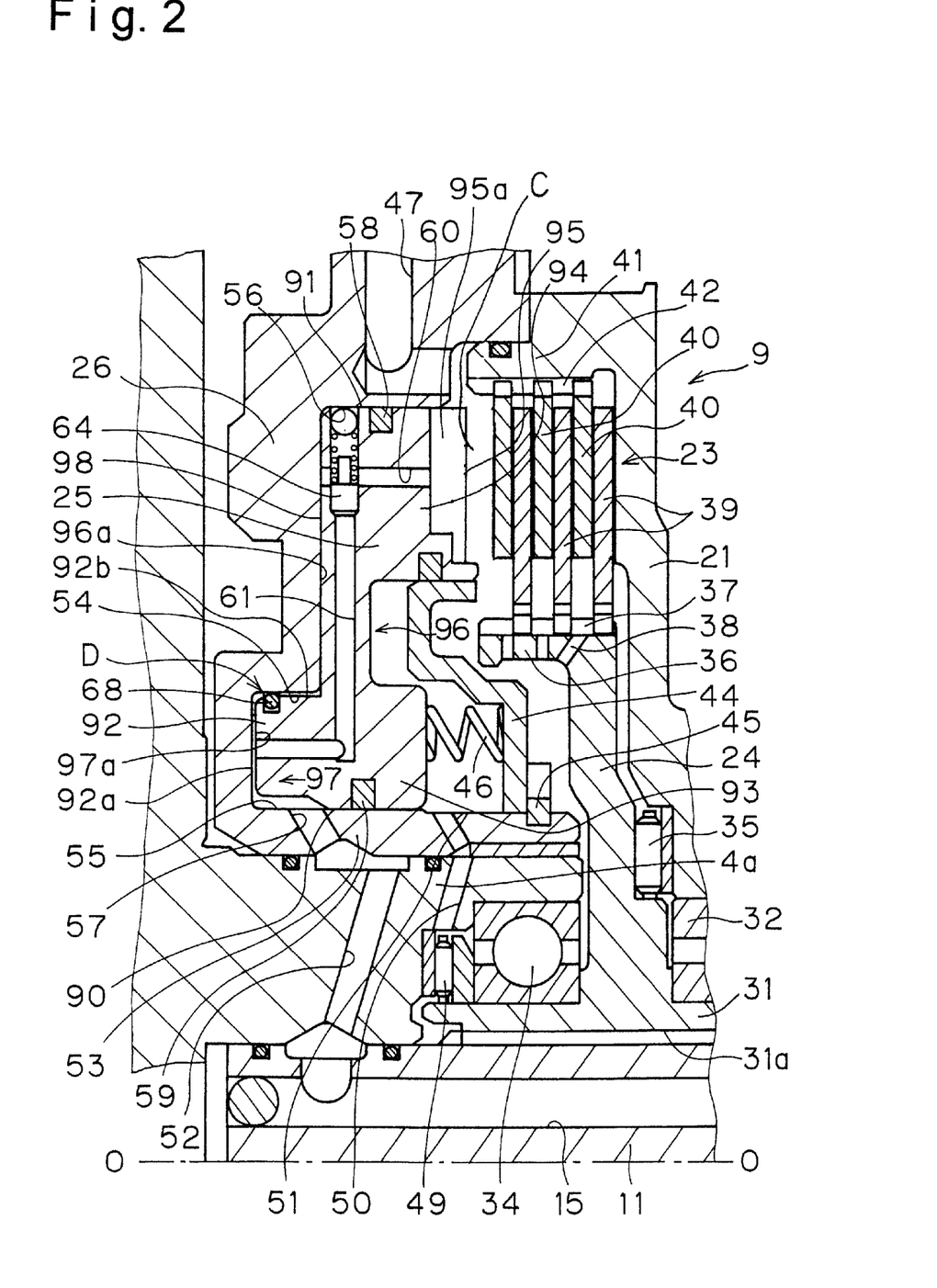
FIG. 2 is an enlarged, partial cross-sectional schematic view of the power disconnecting clutch of the torque converter illustrated in FIG. 1 with the power disconnecting clutch in the clutch released position.
Figure 3:
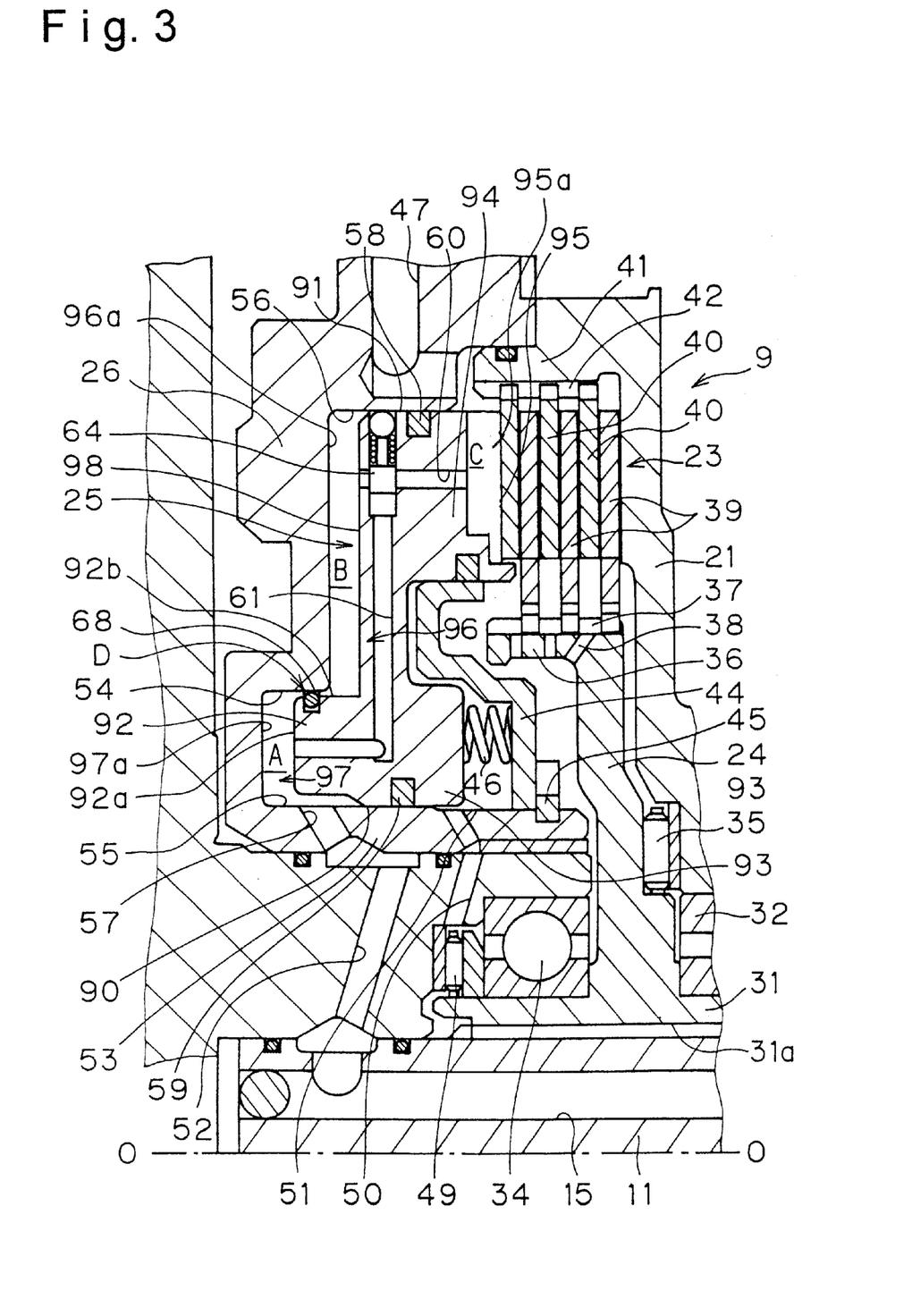
FIG. 3 is an enlarged, partial cross-sectional schematic view of the power disconnecting clutch of the torque converter illustrated in FIG. 1 with the power disconnecting clutch in the clutch engaged position.

Referring now to FIGS. 2 and 3, these Figures will now be used to describe in detail the power disconnecting clutch 9. In particular, FIG. 2 illustrates the power disconnecting clutch 9 in the clutch engaged state. FIG. 3, on the other hand, illustrates the power disconnecting clutch 9 in the clutch released state. The power disconnecting clutch 9 is mainly comprised of a drive member 21, a driven member 24, a clutch engaging member 23, a piston 25 and a hydraulic chamber structural member 26.

The drive member 21 is the annular plate member, which is disposed on the engine side of the turbine 6. The inner periphery of the drive member 21 is fixedly coupled to the inner periphery of the turbine 6 by a plurality of bolts 22. A tubular member 41 is formed on the outer periphery of the drive member 21, and projects axially towards the engine side of the turbine 6. Several teeth 42 are formed on the inner peripheral surface of the tubular member 41. The teeth 42 are circumferential spaced apart and extend in the axial direction.

The driven member 24 is an annular plate member, which is disposed on the engine side of the drive member 21. A tubular member 31 is formed on the inner periphery of the driven member 24, and extends axially in both directions. A spline grooves 31a are formed on the inner peripheral surface of the tubular member 31. These spline grooves 31a engage the spline grooves of the main drive shaft 11. A tubular member 36 is formed on the outer periphery of the driven member 24, and projects towards the engine side of the turbine 6. Spline grooves 31a are formed on the inner peripheral surface of the tubular member 31. The tubular member 36 is disposed concentrically to the inner peripheral portion of the tubular member 41. Several teeth 37 are formed on the outer peripheral surface of the tubular member 36. The teeth 37 of the tubular member 36 extend in an axial direction. Several holes 38 are formed in the tubular member 36. These holes 38 pass through the tubular member 36 in substantially radial directions.

A clutch engaging member 23 is constructed from a plurality of driven plates 39 and a plurality of drive plates 40. The driven plates 39 and the drive plates 40 are alternately disposed axially relative to each other. The driven plates 39 and the drive plates 40 are also located radially between the tubular member 41 and tubular member 36. The driven plates 39 have teeth formed on their inner peripheral edges, which engage the teeth 37 of the tubular member 36.

A friction facing is affixed to each of the axially facing surfaces of the driven plates 39. The drive plates 40 also have teeth formed on their outer peripheral edges to engage the teeth 42 of the tubular member 41.

The piston 25 is an annular or disk-shaped member, which is disposed on the engine side of the clutch engaging member 23. The piston 25 can move to engage the clutch engaging member 23 as well as move to be disengaged from the clutch engaging member 23. The piston 25 has an inner peripheral surface 90 and an outer peripheral surface 91. A first annular member 92 is formed on the inner peripheral portion of the piston 25. The first annular member 92 projects axially towards the engine side of turbine 6 from the inner peripheral portion of the piston 25. A second annular member 93 is formed on the inner peripheral portion of the piston 25. The second annular member 93 projects axially from the inner peripheral portion of the piston 25 towards the transmission side of turbine 6. A third annular member 94 is formed on the exterior peripheral portion of the piston 25. The third annular member 94 projects axially from the exterior peripheral portion of the piston 25 towards the transmission side of turbine 6.

The third annular member 94 has an end face 95, which faces axially towards the transmission side. The end face 95 of the third annular member 94 is disposed adjacent to the clutch engaging member 23. Several radial grooves 95a are formed on the end face 95 of the piston 25. These radial grooves 95a are open at both radial ends. Even in the clutch engaged position as shown in FIG. 3, several spaces C are formed by these grooves 95a between the third annular member 94 of the piston 25 and clutch engaging member 23.

The hydraulic chamber structural member 26 is disposed on the engine side of the piston 25. As shown in FIG. 3, the hydraulic chamber structural member 26 together with piston 25 form a first hydraulic chamber A and a second hydraulic chamber B. The hydraulic chamber structural member 26 is an annular member. As seen in FIG. 1, hydraulic chamber structural member 26 is disposed in the annular space between the projections 4a and 4b of the front cover 4. The outer peripheral surface of the hydraulic chamber structural member 26 is in contact with the inner peripheral surface of the projection 4b of the front cover 4. The inner peripheral surface of the hydraulic chamber structural member 26 is in contact with the outer peripheral surface of the projection 4a.

An annular recess 96 is formed in the hydraulic chamber structural member 26 for slidably accommodating piston 25 therein. The annular recess 96 is formed in the axial surface of the hydraulic chamber structural member 26, which faces the transmission. An annular groove 97 is formed on the innermost circumference of the annular recess 96. Groove 97 is deeper than the other portions of the annular recess 96. The inner peripheral surface 55 of the annular recess 96 is formed by the outer peripheral surface of the tubular member 53. Tubular member 53 extends from the inner peripheral edge of the hydraulic chamber structural member 26 towards the transmission.

The first annular member 92 of the piston 25 is inserted into the annular groove 97. The first hydraulic chamber A is formed between the annular groove 97 and the first annular member 92. Namely, the first hydraulic chamber A is defined by the outer and inner peripheral surfaces 54 and 55 of the annular groove 97, the end face 92a of the first annular member 92 of the piston 25, and the bottom surface 97a of the annular groove 97. The end face 92a of the first annular member 92 of the piston 25 becomes the pressure-receiving surface of the piston 25 in the first hydraulic chamber A in the axial direction.

The inner peripheral surface 90 of the piston 25 is disposed adjacent to the inner peripheral surface 55 of the annular recess 96. An O-ring 59 is disposed in the inner peripheral surface 90 of the piston 25, and contacts the inner peripheral surface 55 to create a seal therebetween. The outer peripheral surface 92b of the first annular member 92 of the piston 25 is disposed adjacent to the outer peripheral surface 54 of the annular groove 97. The seal ring 68 (annular sealing member) is in contact with the outer peripheral surface 54. The sealing ring 68 is disposed on the outer peripheral surface 92b of the first annular member 92.

A seal ring 68 is disposed inside an annular groove formed on the engine end of the outer peripheral surface 92b. The seal ring 68 allows only a small, predetermined amount of hydraulic oil to flow in an axial direction between outer peripheral surface 92b of the annular wall and outer peripheral surface 54 of hydraulic chamber structural member 26. Specifically, the seal ring 68 forms a flow restriction member D that restricts the flow of hydraulic oil between the first hydraulic chamber A and the second hydraulic chamber B. Cuts or holes can be formed in the seal ring 68 to permit the hydraulic oil to flow between the first hydraulic chamber A and the second hydraulic chamber B. As described above, since the flow restriction member D is formed from the seal ring 68 disposed between the annular surfaces or walls 92b and 54, which are adjacent to each other, the structures forming the first and second hydraulic chambers A and B are quite simple.

The second hydraulic chamber B is defined by the axial surface 96a of the annular recess 96 of the hydraulic chamber structural member 26, the axially facing surface 98 of the piston 25 on the engine side, the peripheral surface 92b of the first annular member 92 of the piston 25 and the outer peripheral surface 56 of the annular recess 96 of the hydraulic chamber structural member 26. The outer peripheral surface 91 of the piston 25 is disposed adjacent to the outer peripheral surface 56 of the annular recess 96 of the hydraulic chamber structural member 26. The O-ring 58 is disposed in the outer peripheral surface of the piston 25 and contacts outer peripheral surface 56 of the annular recess 96 to create a seal therebetween. The axially facing surface 98 of the piston 25 functions as the pressure-receiving surface of the piston 25 in the second hydraulic chamber B.

Several oil paths 47 (exhaust ports) are formed in the hydraulic chamber structural member 26. Oil paths 47 extend radially from the outer peripheral side of the space C to the outer peripheral surface of the hydraulic chamber structural member 26. In addition, several oil paths 48 are formed in the outer periphery of the front cover 4 to receive hydraulic oil passing radially through the oil paths 47 as seen in FIG. 1. That is, the hydraulic oil in the space C is moved to the out of the turbine body 3 though the oil paths 47 and 48 by centrifugal force so that it is eventually discharged from the torque converter body 3.

Referring again to FIG. 2, the power disconnecting clutch 9 is illustrated in the clutch released state. In the clutch released state, the piston 25 is disposed at the position farthest from the clutch engaging member 23. In this state, the volumes of the first hydraulic chamber A and the second hydraulic chamber B are almost become zero. As shown in FIG. 3, the power disconnecting clutch 9 is illustrated in the clutch engaged state. In the clutch engaged state, the piston 25 is disposed at the position closest to the clutch engaging member 23. In this state, the volumes of the first hydraulic chamber A and the second hydraulic chamber B are at their maximum volumes. In both the clutch engaged state and the clutch released state, the seal ring 68 remains in contact with the outer peripheral surface 54 to form the flow restriction member D.

Several oil paths 57 are formed on the engine end of the tubular member 53. The oil paths 57 pass radially through the tubular member 53, and connect with first hydraulic chamber A. Several oil paths 52 are formed in the projection 4a on the inner peripheral side of the front cover 4. These oil paths 52 are radially located in positions corresponding to the oil paths 57. The oil paths 52 extend radially between the oil paths 57 of the hydraulic chamber structural member 26 and the oil paths 15 of the main drive shaft 11. In particular, the inner ends of the paths 52 are connected to the oil paths 15 of the main drive shaft 11, while the outer ends of the paths 52 are connected to the oil paths 57. Thus, the hydraulic oil can be supplied from the oil paths 15 through the oil paths 52 and 57 to the first hydraulic chamber A.

The annular support plate 44 is disposed in the outer peripheral side of the tubular member 53. The outer peripheral surface of the supporting plate 44 can axially slide and come into contact with the inner peripheral surface of the third annular member 94 of the piston 25. The inner periphery of the support plate 44 is supported on the transmission side by the support ring 45, and is fixedly coupled to the outer peripheral surface on the front end of the tubular member 53.

Coil springs 46 are disposed between the support plate 44 and the inner periphery of the piston 25 to form a return spring. The coil springs 46 are elastic members that are axially compressed when hydraulic oil pressure is supplied to the first hydraulic chamber A. Piston 25 biased towards the engine by the driving force coil springs 46 when hydraulic oil pressure is not supplied to the first hydraulic chamber A.

A bearing 32 is disposed on the outer peripheral surface of the transmission side of the tubular member 31 of the driven member 24. The inner race of the bearing 32 is fixedly coupled to the outer peripheral surface of the tubular member 31, while outer race of the bearing 32 is fixedly coupled to the inner periphery of the drive member 21.

A thrust bearing 35 is axially disposed in the interior between the drive member 21 and the driven member 24. A bearing 34 is radially disposed between the outer peripheral surface of the transmission side of the tubular member 31 and the inner peripheral side of the projection 4a. The inner race of the bearing 34 is fixedly coupled to the outer peripheral surface of the tubular member 31. The outer race of the bearing 34 is fixedly coupled to the inner peripheral side on the transmission side of the projection 4a. The thrust bearing 49 is axially disposed between the inner race of the bearing 34 and the inner peripheral side of the projection 4a.

Several oil paths 50 are formed in the projection 4a on the inner peripheral side. These oil paths 50 extend in radial directions and pass through the projection 4a to a part corresponding to the thrust bearing 49. Several oil paths 51 are formed in the tubular member 53. The oil paths 51 pass radially through the tubular member 53 so that the outer ends of the oil paths 51 substantially align with a corresponding one of the oil paths 50. The outside ends of the oil paths 51 opens to the space where the coil springs 46 are disposed.

The lock-up clutch 10 is disposed on the outer peripheral side of the power disconnecting clutch 9. The lock-up clutch 10 is constructed from a ring member 20, a clutch engaging member 27 and an engaging member 28. The ring member 20 fixedly couples the front cover 4 and the shell of the impeller 5 together by the bolts 19 described earlier. The ring member 20 is constructed from a first disk-shaped member a tubular member extending in the axial direction from the inner peripheral edge, and a second disk-shaped member extending in the radial direction from the transmission side end. The second disk-shaped member is disposed between the front cover 4 and the shell of the impeller 5. Teeth extending in the axial direction are formed on the inner peripheral surface of the tubular member. The engaging member 28 is an annular member, which is disposed on the inner peripheral side of the ring member 20. Teeth extending in the axial direction are formed on the outer peripheral surface of the engaging member 28. The clutch engaging member 27 is disposed in the radial direction between tubular member of the ring member 20 and the engaging member 28. The clutch engaging member 27 is constructed from a plurality of drive plates and driven plates disposed alternately in the axial direction. The piston 30 actuated by the hydraulic oil pressure is disposed on the engine side of the clutch engaging member 27. The engaging member 28 connects to the outer periphery of the drive member 21 through the coil springs 29.

Next, the hydraulic oil pressure exhaust mechanism for releasing the hydraulic oil pressure in the first and second hydraulic chambers A and B is described during the clutch release action of the power disconnecting clutch 9. In this embodiment, the hydraulic oil pressure exhaust mechanism is constructed inside the piston 25. The hydraulic oil pressure exhaust mechanism basically includes the first oil paths 60, the second oil paths 61, and the spool 64.

The first oil paths 60 are formed on the outer periphery of the piston 25, and are performed by a plurality of holes passing through the third annular member 94 in an axial direction. The first oil paths 60 have one end opening inside grooves 95a. Specifically, the first oil paths 60 connect the second hydraulic chamber B and the space C together. The second oil paths 61 are a plurality of holes with one end opening into the first hydraulic chamber A, and the other end connecting with the middle portion of the first oil paths 60. In a more detailed description, the second oil paths 61 extend in an axial direction from the end face 92a in an axial direction of the first annular member 92. Second oil paths 61 then extend in a radial direction, where they intersect with the first oil paths 60. In the second oil paths 61, the parts on both sides of the first oil paths 60 from the slide holes 62 which have larger diameters compared to the diameters of the first oil paths 60. The first oil paths 60 pass through the middle portions of slide holes 62. The first hydraulic chamber A side of each of the slide holes 62 (left side as viewed in FIG. 4) forms a first member or portion 62a. The interior side (right side as viewed in FIG. 4) of each of the slide holes forms a second member or portion 62b.

Figure 4:
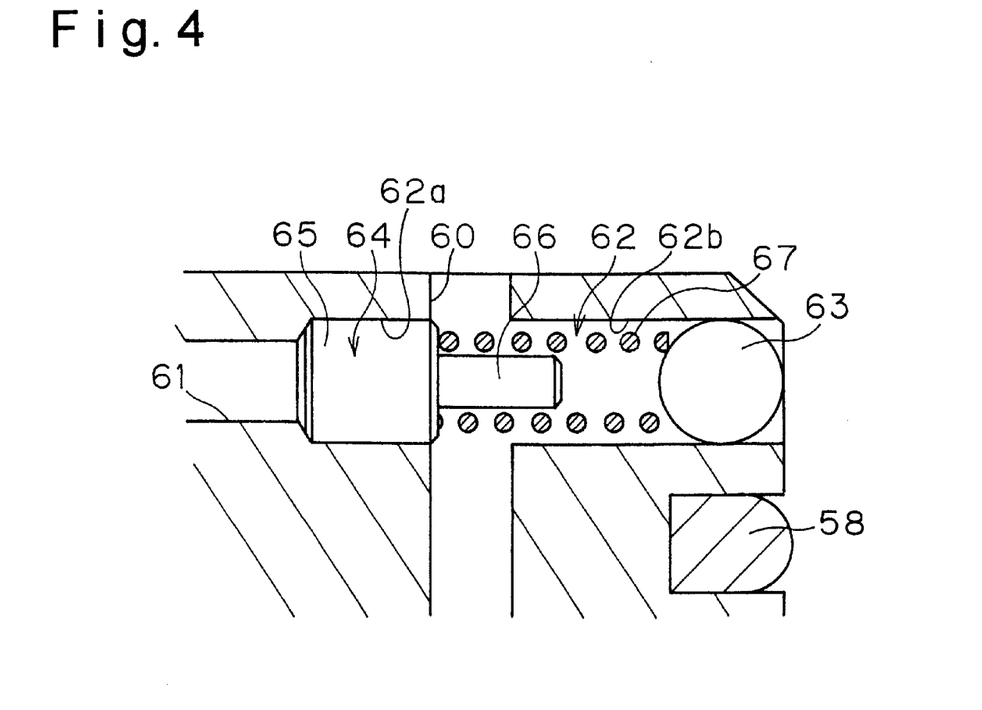
FIG. 4 is an enlarged, partial cross-sectional view of the hydraulic oil pressure exhaust mechanism of the power disconnecting clutch of the torque converter illustrated in FIG. 1 with the power disconnecting clutch in the clutch engaged position.
Figure 6:
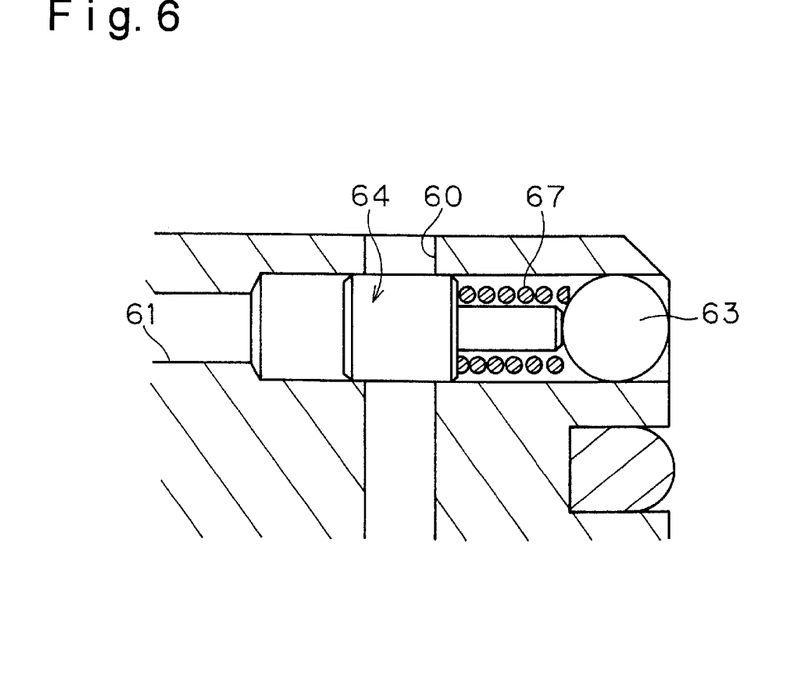
FIG. 6 is an enlarged, partial cross-sectional view of the hydraulic oil pressure exhaust mechanism of the power disconnecting clutch of the torque converter illustrated in FIG. 1 with the power disconnecting clutch in the clutch engaged position.

The spools 64 (opening/closing member) are disposed at the intersection of the first oil paths 60 and the second oil paths 61. Basically, each of the spools 64 is the member for opening and closing one of the first oil paths 60. The spools 64 are disposed inside the slide holes 62 of the second oil paths 61 for radial movement inside the slide holes 62. The spools 64 have a cylindrical shape that extends along the slide holes 62. Each of the spools 64 has a large diameter member or section 65 that functions as the valve and a small diameter member or section 66. The small diameter member or section 66 extends from the large diameter member or section 65 to the second portion 62b of the slide hole 62. The large diameter members 65 has almost the same diameter as the slide holes 62 so that they can slide in close contact with the wall surface of the slide holes 62. The large diameter members 65 always disconnect the second oil paths 61 and the first oil paths 60 regardless of the position of the spools 64. In addition, the large diameter members 65 open or close the first oil paths 60 according to the motion position. Specifically, spools 64 can move between a first position where the spool 64 is closest to the second oil path 61 side, as shown in FIG. 4, to open the first oil paths 60. Spool 64 can also move between the second position where the spool 64 is closest to the sphere 63 to close the first oil path 60 (disconnection position) as shown in FIG. 6.

The coil springs 67 (drive member) are disposed in the second members or portions 62b of the slide holes 62. One end of the coil springs 67 support the spheres 63, which are positioned on the outside in a radial direction of the second members 62b. The other ends of the coil springs 67 are in contact with the large diameter members 65 of the spools 64. The small diameter members 66 of the spools 64 are inserted into the coil springs 67. In the state shown in FIGS. 2 and 4, where the hydraulic oil pressure is not applied in the first hydraulic chamber A, the spools 64 are closest to the first hydraulic chamber A side of the slide holes 62. In this state, the coil springs 67 apply a small driving force to drive the spools 64 to the left side as viewed in FIG. 4. In other words, the coil springs 67 are slightly compressed in the state shown in FIG. 4. Thus, the coil springs 67 remain in contact with the spools 64 in the extended state. As shown in FIG. 4, since the small diameter members 66 of the spools 64 and the coil springs 67 are only disposed at the intersection of the second oil paths 61 and the first oil path 60, the first oil paths 60 are open. This allows the hydraulic oil to flow between the second hydraulic chamber B and the space C.

Next, the operation of the clutch-actuated piston structure of the power disconnecting clutch 9 will be described using the graph of the pressure inside the first hydraulic chamber A and the time T in FIG. 7.

Figure 7:
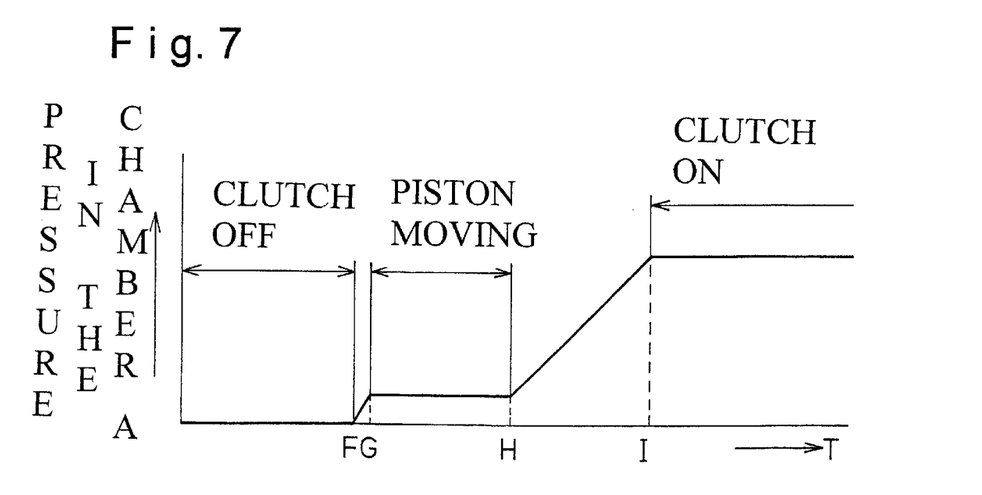
FIG. 7 is a graph illustrating the temporal changes of the pressure in hydraulic chamber A of the torque converter illustrated in FIG. 1.

The hydraulic oil pressure is supplied to the first hydraulic chamber A from the clutch disengaged state as shown in FIG. 2 (point F as viewed in FIG. 7). This gradually increases the pressure inside the first hydraulic chamber A. When the hydraulic oil fills the first hydraulic chamber A and the force acting on the piston 25 exceeds the driving force from the coil springs 46, the piston 25 starts moving towards the clutch engaging member 23 (point G as viewed in FIG. 7). During the operation of the piston 25, hydraulic oil is supplied to the second hydraulic chamber B through the flow restriction member D from the first hydraulic chamber A. The amount of hydraulic oil supplied to the second hydraulic chamber is a small amount.

Figure 5:
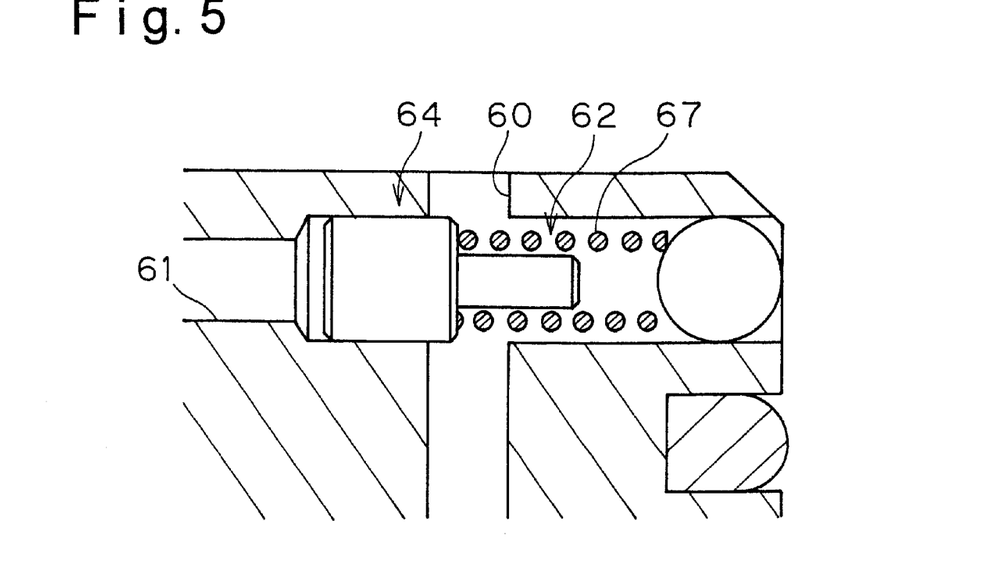
FIG. 5 is an enlarged, partial cross-sectional view of the hydraulic oil pressure exhaust mechanism of the power disconnecting clutch of the torque converter illustrated in FIG. 1 with the power disconnecting clutch in the piston actuated position.

As shown in FIG. 5, the hydraulic oil pressure exhaust structure of the piston 25 uses the hydraulic oil pressure from the second oil paths 61 to move the spools 64. The spools 64 resist the driving force of the coil springs 67, and moves to the right within the slide holes 62. Specifically, the large diameter members 65 of the spools 64 gradually close the first oil paths 60. At the intermediate position as shown in FIG. 5, the spools 64 do not completely close the first oil paths 60 which connect the second hydraulic chamber B and the space C together. This movement of the spools 64 results in the setting force acting on spools 64, from the second oil paths 61 being larger than the sum of forces acting on the spools 64 from the first oil paths 60 and the forces acting on spools 64 from coil springs 67. In other words, a difference in pressure is produced on both sides of the spools 64 (first oil path sides and second oil path sides) by the pressure differential generation mechanism (formed of the first hydraulic chamber A, the second hydraulic chamber B, and the flow restriction member D). Spools 64 are then moved from the first positions to the second positions. During the operation of the piston 25, the pressure in the first hydraulic chamber A is proportional to the spring force.

When spools 64 are closest to the sphere 63 (at the second positions) and the first oil paths 60 are closed as shown in FIG. 6, almost simultaneously, or slightly before or after, the piston 25 comes into contact with one of the plates 40 to engage the clutch engaging member 23 (point H as viewed in FIG. 7). Compared to prior art structures, the time is drastically shortened on action by the operator from the clutch until the starting of the transmission torque in the clutch engaging member 23. The first reason for this shortened action time is that the hydraulic chamber formed between the piston 25 and the hydraulic chamber structural member 26 is divided into the first hydraulic chamber A and the second hydraulic chamber B. Furthermore, only the first hydraulic chamber A is used as the hydraulic oil chamber for moving the piston 25. Since the first hydraulic chamber A has a smaller volume compared to conventional chambers, the moving speed of the piston 25 is considerably faster. Secondly, during movement of the piston 25 towards the clutch engaging member 23 (i.e., when the piston 25 moves adjacent to the clutch engaging member 23 to eliminate the gap between the plates 39 and 40) the second hydraulic chamber B is connected to the space C by the first oil paths 60. Thus, a negative pressure (vacuum state) is prevented in the second hydraulic chamber B. Specifically, the actuation mechanism (comprised of the first oil paths 60, the second oil paths 61, the first hydraulic chamber A and the second hydraulic chamber B) positions the spools 64 at the connection positions when the piston 25 moves away from the hydraulic chamber structural member 26 towards the clutch engaging member 23 to connect the second hydraulic chamber B to the space C and the oil paths 47. The opening/closing member action mechanism positions the spools 64 at the disconnection positions when the piston 25 comes into contact with the clutch engaging member 23.

After point H as viewed in FIG. 7, the hydraulic oil is supplied from the first hydraulic chamber A through the flow restriction member D to the second hydraulic chamber B. Thus, the pressure in the first hydraulic chamber A gradually increases again. As the pressure in the first hydraulic chamber A becomes larger, the transmission torque at the clutch engaging member 23 gradually increases. Since the slope of the transmission torque is gradual, the shock resulting from the clutch being engaged is reduced.

After point H in FIG. 7, the hydraulic oil has filled the second hydraulic chamber B, the pressure in the first hydraulic chamber A becomes constant, and the transmission torque in the clutch engaging member 23 also becomes constant.

When the hydraulic oil pressure application to the first hydraulic chamber A is stopped in the clutch engaged state as shown in FIG. 3, the piston 25 is moved in the direction away from the clutch engaging member 23 by the driving force of the coil springs 46. At this time, the spools 64 of the hydraulic oil pressure exhaust mechanism moves from the state in FIG. 6 to the state shown in FIG. 5 and then to the state shown in FIG. 4. Namely, the first oil paths 60 open, and the hydraulic oil in the second hydraulic chamber B discharges to the space C and the oil paths 47 through the first oil paths 60.

The spools 64 are slide valves that are operated by the hydraulic oil pressure. Stated differently, the pressure difference produced on both sides of the spools 64 by the pressure differential generation mechanism constructed from the first hydraulic chamber A, second hydraulic chamber B, seal ring 68, flow restriction member D, first oil paths 60, and second oil paths 61) of the second oil paths 61 results in the action of the spools 64 being very reliable. Consequently, the problem of the instability in the operation of a conventional check ball (for example, the exhaust hole not opening sufficiently) does not occur, and the hydraulic oil pressure of the second hydraulic chamber B reliably escapes during the piston 25 action when the clutch is released. As a result, the return action of the piston 25 becomes faster.

In addition, when the spools 64 are used, the flow path areas of the first oil paths 60 can be larger. Since the part of the spools 64 covering the exhaust holes are smaller than the check ball, the dimensions do not become large even if the path area of a first oil path 60 becomes large. If the path areas of the first oil paths 60 can be increased, the hydraulic oil pressure in the second hydraulic chamber B during the action of the piston 25 when the clutch is released can be rapidly released, and the return action of the piston 25 is fast.

Embodiment 2

Figure 8:
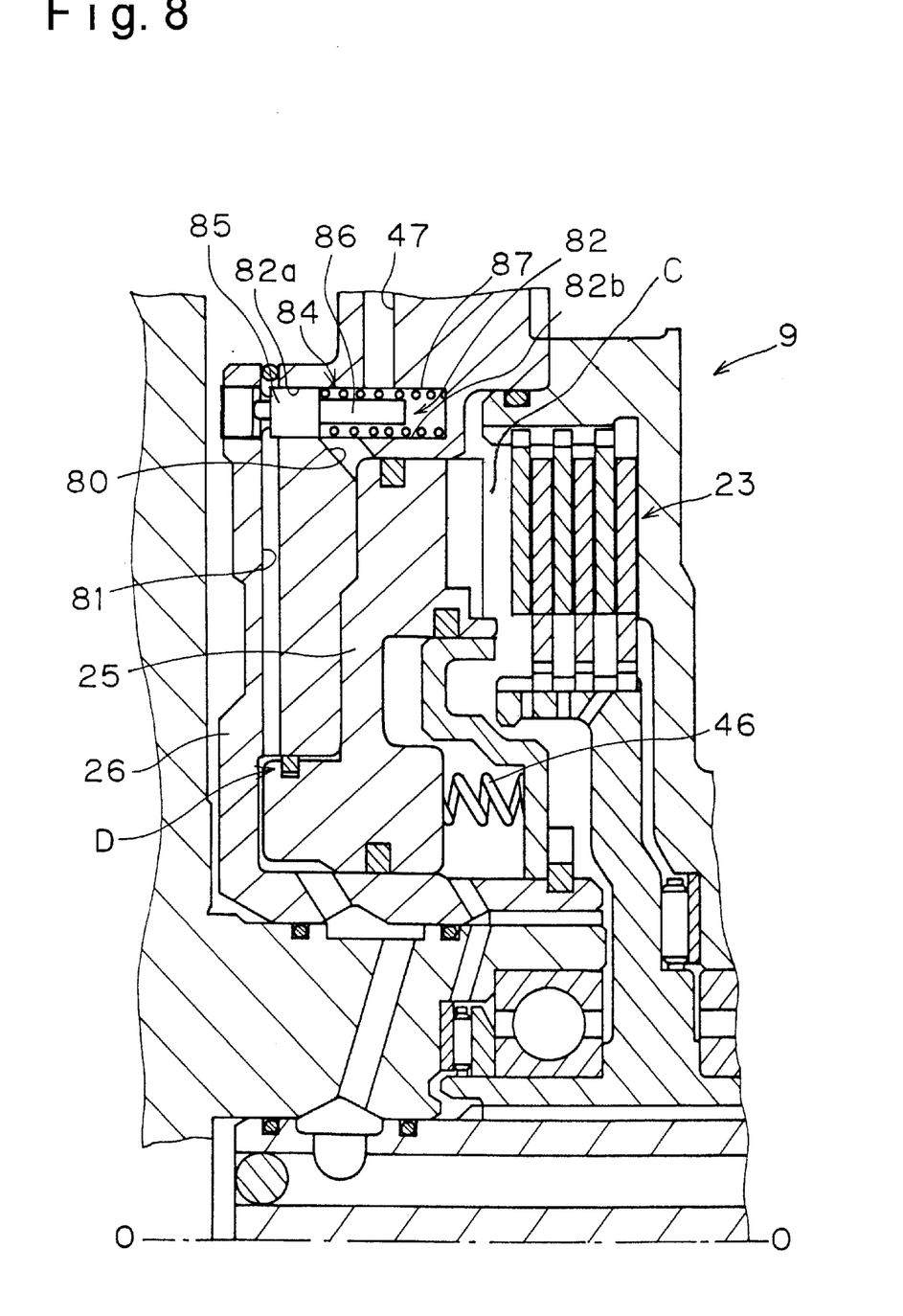
FIG. 8 is an enlarged, partial cross-sectional schematic view of a power disconnecting clutch of the torque converter in accordance with a second embodiment of the present invention with the power disconnecting clutch in the clutch released position.
Figure 9:
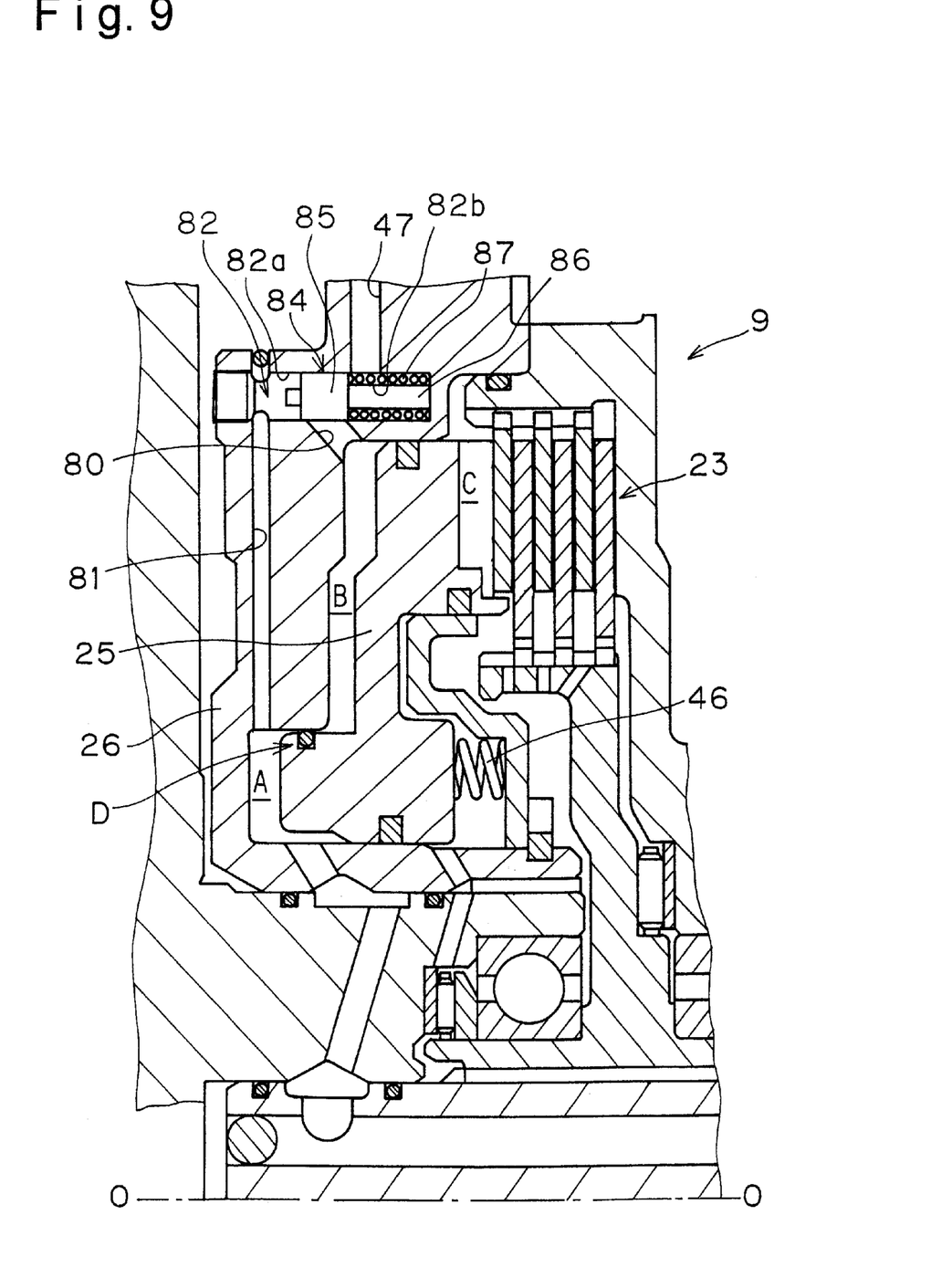
FIG. 9 is an enlarged, partial cross-sectional schematic view of a power disconnecting clutch of the torque converter in accordance with the second embodiment of the present invention illustrated in FIG. 8, with the power disconnecting clutch in the clutch engaged position.

In this second embodiment of the present invention, the hydraulic oil pressure escape mechanism does not have to be inside the piston 25, but rather the hydraulic oil pressure escape mechanism can be disposed inside the hydraulic chamber structural member 26 as shown in FIGS. 8 and 9. The hydraulic oil pressure escape mechanism of this second embodiment is mainly constructed from first oil paths 80, second oil paths 81 and spools 84.

Several first oil paths 80 are formed in the hydraulic chamber structural member 26 to connect the second hydraulic chamber B and the oil paths 47. The first oil paths 80 are the plurality of holes that pass through a plurality of slide holes 82. The slide holes 82 extend in the axial direction to connect the first oil paths 80 to the oil paths 47. Each slide hole 82 has a larger diameter than the first oil paths 80 and the oil paths 47. The first oil paths 80 and the oil paths 47 pass through to the center or middle part of the slide holes 82. The first hydraulic chamber side (left side as viewed in FIG. 9) of each of the slide holes 82 is the first member or portion 82a, and the inner side (right side as viewed in FIG. 9) of each of the slide holes 82 is the second member or portion 82b. The second oil paths 81 are holes that extend radially from the outer peripheral surface of the annular groove 97 and connect to the engine end of the slide holes 82.

Spools 84 (opening/closing member) are disposed at the intersection of the first oil paths 80 and the second oil path 81 for opening and closing the first oil paths 80. The spools 84 are disposed to allow movement in the axial direction within the slide holes 82 of the second oil paths 81. The spools 84 have a cylindrical shape that extends along the slide holes 82. The spools 84 are constructed from a large diameter member 85 which functions as the land and a small diameter member 86 that extends into the second member 82b of the slide holes 82 from the large diameter member 85. The large diameter members 85 have almost the same diameter as the slide holes 82, and can slide in close contact with the wall surface of the slide holes 82. The large diameter members 85 always disconnects the second oil paths 81 from the first oil paths 80 regardless of its position or movement. In addition, the large diameter members 85 will open or close the first oil paths 80 according to the motion position. Specifically, the spools 84 can move between first positions (connection positions) where the spools are closest to the second oil paths 81 to open the first oil paths 80, as shown in FIG. 8, and second positions (disconnection positions) where the spools 84 are closer to the second members 82b to close the first oil paths 80.

The coil springs 87 (driving member) are disposed at the second members 82b of the slide holes 82. One end of the coil springs 87 are supported by the end face of the second members 82b, while the other ends are in contact with the large diameter member 85 of the spools 84. The small diameter members 86 of the spools 84 are inserted into the coil springs 87. In a state as shown in FIG. 8 in which the hydraulic oil pressure does not act on the first hydraulic chamber A, the spools 84 are closest to the first hydraulic chamber A (at the first position) in the slide holes 82. At this time, the coil springs 87 apply a small driving force on the spools 84 to the left side as viewed in FIG. 8. Otherwise, the coil springs 87 stretches to the free length and comes into contact with the spools 84. In the position shown in FIG. 8, the small diameter members 86 of the spools 84 and the coil springs 87 are only disposed in the space positioned between the first oil paths 80 and the oil paths 47 in the slide holes 82. Thus, in this position, the first oil paths 80 are opened to the oil paths 47. The hydraulic oil can flow through the oil paths 80 between the second hydraulic chamber B and the oil path 47.

Next, the action of the clutch-actuated piston structure of the power disconnecting clutch 9 will be described using the graph of the pressure in the first hydraulic chamber A and the time T in FIG. 7.

The hydraulic oil pressure is supplied to the first hydraulic chamber A from the clutch disengaged state as shown in FIG. 8 (point F of FIG. 7). This will gradually increase the pressure in the first hydraulic chamber A. When the hydraulic oil is filled in the first hydraulic chamber A and the force acting on the piston 25 exceeds the driving force from the coil springs 46, the piston 25 starts moving towards the clutch engaging member 23 (point G of FIG. 7). During the operation of the piston 25, hydraulic oil is supplied to the second hydraulic chamber B through the flow restriction member D from the first hydraulic chamber A. The amount of hydraulic oil supplied to the second hydraulic chamber B through the flow restriction member D is quite small. In addition, in the hydraulic oil pressure exhaust structure in the piston 25, the spools 84 resist the driving force of the coil springs 87 by using the hydraulic oil pressure from the second oil paths 81 to move inside the slide holes 82. Specifically, the large diameter members 85 of the spools 84 gradually close one end of the first oil paths 80. The spools 84 at an intermediate position do not completely disconnect the first oil paths 80, but connect the second hydraulic chamber B to the oil path 47. The ability of the spools 84 to move in this way results in the setting force acting on the spools 84 from the second oil paths 81 to be larger than the sum of the force acting on the spools 84 from the first oil paths 80 and the force acting on the spools 84 from the coil springs 87. In other words, a pressure difference is produced on both sides of the spools 84 (first oil path sides and second oil path sides) by the pressure differential generation mechanism (constructed of the first hydraulic chamber A, the second hydraulic chamber B, and the flow restriction member D) to move the spools 84 from the first position to the second position. During the operation of the piston 25, the pressure in the first hydraulic chamber A is proportional to the spring force.

When the spools 84 shown in FIG. 9 close the first oil paths 80, almost simultaneously or slightly before or after, the piston 25 is in contact with the plate 40 and engages the clutch engaging member 23 (point H of FIG. 7).

The time from the clutch on action by the operator to starting the transmission torque in the clutch engaging member 23 is drastically decreased compared to the prior conventional methods. The first reason is that the hydraulic chamber between the piston 25 and the hydraulic chamber structural member 26 is divided into the first hydraulic chamber A and the second hydraulic chamber B. Furthermore, only the first hydraulic chamber A is used as the hydraulic chamber for moving the piston 25. Since the volume of the first hydraulic chamber A is quite small compared to a conventional chamber, the moving speed of the piston 25 is faster than the conventional chamber. The second reason is that the second hydraulic chamber B is connected to the space C by the first oil path 80, when the piston 25 moves towards the clutch engaging member 23 (the piston 25 moves close to the clutch engaging member 23 and eliminates the gap between the plates 39, 40), a negative pressure (vacuum state) is prevented in the second hydraulic chamber B. In other words, the actuation mechanism (comprised of the first oil path 80, second oil path 81, first hydraulic chamber A, and second hydraulic chamber B) positions the spool 84 at the connection position when the piston 25 moves from the hydraulic chamber structural member 26 side to the clutch engaging member 23 side. When the piston 25 is in contact with the clutch engaging member 23, the opening/closing member is disposed at the second position (disconnection position).

After the point H in FIG. 7 is reached, the hydraulic oil is supplied from the first hydraulic chamber A through the flow restriction member D to the second hydraulic chamber B, and the pressure in the first hydraulic chamber A gradually increases again. As the pressure in the first hydraulic chamber A increases, the transmission torque at the clutch engaging member 23 gradually increases. Since the slope of the transmission torque is gradual, the shock from engaging the clutch is reduced.

After the point H in FIG. 7 is reached, the hydraulic oil has filled the second hydraulic chamber B, the pressure in the first hydraulic chamber A becomes constant, and the transmission torque in the clutch engaging member 23 also becomes constant.

Releasing the Clutch

When the hydraulic oil pressure supply to the first hydraulic chamber A is stopped in the clutch engaged state as shown in FIG. 9, the piston 25 moves in the direction away from the clutch engaging member 23 by the driving force of the coil springs 46. At this time, the spools 84 of the hydraulic oil pressure exhaust mechanism gradually open the first oil paths 80. The hydraulic oil of the second hydraulic chamber B discharges through the first oil paths 80 to the oil paths 47.

The spools 84 are a slide valves operated by the hydraulic oil pressure. In other words, the pressure difference produced on both sides of the spools 84 by the pressure differential generation mechanism (constructed from the first hydraulic chamber A, second hydraulic chamber B, seal ring 68, flow restriction member D, first oil path 80 and second oil path 81) of the second oil path 81, the action of the spool 84 is reliable. Consequently, the problem of the instability in the operation of a conventional check ball (for example, the exhaust hole not opening sufficiently) does not occur, and the hydraulic oil pressure of the second hydraulic chamber B fully escapes during the piston 25 action when the clutch is released. As a result, the return action of the piston 25 becomes faster.

In addition, when the spools 84 are used, the flow path areas of the first oil paths 80 of the exhaust holes can be larger. Since the part of the spools 84 covering the exhaust holes can be smaller than the check ball, the dimensions do not become large even if the path area of the first oil paths 80 becomes large. If the path areas of the first oil paths 80 can be increased, the hydraulic oil pressure in the second hydraulic chamber B can be rapidly released during the action of the piston 25 when the clutch is released, and the return action of the piston 25 is fast.

The present invention of this application can be applied to hydraulic oil pressure actuated clutches other than the power disconnecting clutch in the torque converter.

Effects of the Invention

In the clutch-actuated piston structure related to the present invention, since the volume of the hydraulic chamber (first hydraulic chamber), which moves the clutch, can be smaller than in the past, the moving speed of the piston becomes faster. As a result, starting the transmission torque of the clutch is faster than prior art devices.

In the clutch-actuated piston structure related to the present invention, the first path is opened and closed by the opening/closing member operated by hydraulic oil pressure, which results in the action of the opening/closing member being more stable. Consequently, the hydraulic oil pressure of the second hydraulic chamber can reliably escape during the piston action when the clutch is released. As a result, the return action of the piston is faster than prior art devices.

While only several embodiments have been chosen to illustrate the present invention, it will be apparent to those skilled in the art from this disclosure that various changes and modifications can be made herein without departing from the spirit or scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch-actuated piston structure for engaging and releasing a clutch engaging member by hydraulic oil and discharging hydraulic oil through an exhaust port, said clutch-actuated piston structure comprising:

a piston member having first and second sides, with said first side being adapted to be disposed adjacent to the clutch engaging member and capable of moving close to and away from the clutch engaging member; and a hydraulic chamber structural member movably coupled relative to said piston member, said second side of said piston member and said hydraulic chamber structural member forming therebetween a first hydraulic chamber for receiving hydraulic oil and a second hydraulic chamber fluidly connected to said first hydraulic chamber via a flow restriction member that permits a limited amount of hydraulic oil to pass therethrough, each of said piston member and said hydraulic chamber members having annular surfaces which are adjacent to each other, said first hydraulic chamber and said second hydraulic chamber being concentrically arranged annular spaces, which are divided by said annular surfaces, and said flow restriction member being an annular sealing member disposed between said annular surfaces for restricting flow of hydraulic oil from said first hydraulic chamber to said second hydraulic chamber.

2. The clutch-actuated piston structure according to claim 1, further comprising a first oil path formed in one of said piston member and said hydraulic chamber structural member, with said first oil path extending between said second hydraulic chamber and the exhaust port, an opening/closing member disposed in said first oil path and movable between an open position connecting said second hydraulic chamber and the exhaust port and a closed position disconnecting said second hydraulic chamber and the exhaust port, and an actuating mechanism acting on said opening/closing member to maintain said opening/closing member in said open position when said piston member moves from said hydraulic chamber structural member towards the clutch engaging member, and to maintain said opening/closing member in said closed position when said piston member contacts the clutch engaging member.

3. The clutch-actuated piston structure according to claim 1, further comprising a first oil path formed in one of said piston member and said hydraulic chamber structural member, said first oil path extends between said second hydraulic chamber and the exhaust port, an opening/closing member disposed in said first oil path and movable between a first position connecting said second hydraulic chamber and the exhaust port and a second position for disconnecting said second hydraulic chamber and the exhaust port, a drive member holding said opening/closing member in said first position, and a second oil path in fluid communication with said first hydraulic chamber for moving said opening/closing member from said first position to said second position by hydraulic oil being supplied to said first hydraulic chamber to counteract said driving member.

4. A clutch-actuated piston structure for engaging and releasing a clutch engaging member by hydraulic oil and discharging hydraulic oil through an exhaust port, said clutch-actuated piston structure comprising:

a piston member having first and second sides, with said first side being adapted to be disposed adjacent to the clutch engaging member and capable of moving close to and away from the clutch engaging member;

a hydraulic chamber structural member movably coupled relative to said piston member, said second side of said piston member and said hydraulic chamber structural member forming therebetween a first hydraulic chamber for receiving hydraulic oil and a second hydraulic chamber fluidly connected to said first hydraulic chamber via an open flow restriction member that continuously permits a limited amount of hydraulic oil to pass therethrough;

a first oil path formed in one of said piston member and said hydraulic chamber structural member, said first oil path extending between said second hydraulic chamber and the exhaust port;

an opening/closing member disposed in said first oil path and movable between an open position connecting said second hydraulic chamber and the exhaust port and a closed position disconnecting said second hydraulic chamber and the exhaust port; and an actuating mechanism acting on said opening/closing member to maintain said opening/closing member in said open position when said piston member moves from said hydraulic chamber structural member towards the clutch engaging member, and to maintain said opening/closing member in said closed position when said piston member contacts the clutch engaging member.

5. The clutch-actuated piston structure according to claim 4, wherein said first oil path is formed in said hydraulic chamber structural member.

6. The clutch-actuated piston structure according to claim 4, further comprising a second oil path formed in one of said piston member and said hydraulic chamber structural member, with said second oil path extending between said first hydraulic chamber and said first oil path such that hydraulic pressure in said first hydraulic chamber controls movement of said opening/closing member from said open position to said closed position.

7. A clutch-actuated piston structure for engaging and releasing a clutch engaging member by hydraulic oil and discharging hydraulic oil through an exhaust port, said clutch-actuated piston structure comprising:

a piston member having first and second sides, with said first side being adapted to be disposed adjacent to the clutch engaging member and capable of moving close to and away from the clutch engaging member;

a hydraulic chamber structural member movably coupled relative to said piston member, said second side of said piston member and said hydraulic chamber structural member forming therebetween a first hydraulic chamber for receiving hydraulic oil and a second hydraulic chamber fluidly connected to said first hydraulic chamber via a flow restriction member that permits a limited amount of hydraulic oil to pass therethrough;

a first oil path being formed in said piston member, said first oil path extending between said second hydraulic chamber and the exhaust port;

an opening/closing member disposed in said first oil path and movable between an open position connecting said second hydraulic chamber and the exhaust port and a closed position disconnecting said second hydraulic chamber and the exhaust port; and an actuating mechanism acting on said opening/closing member to maintain said opening/closing member in said open position when said piston member moves from said hydraulic chamber structural member towards the clutch engaging member, and to maintain said opening/closing member in said closed position when said piston member contacts the clutch engaging member.

8. A hydraulic actuating assembly, comprising a first rotary member adapted to be fixedly coupled to an input shaft;

a second rotary member adapted to be fixedly coupled to an output shaft, said first and second rotary members being rotatably coupled together;

a housing coupled to one of said first and second rotary members for rotation therewith, said housing including an exhaust port;

a clutch engaging member having a first friction member coupled to said first rotary member and a second friction member coupled to said second rotary member;

a piston member having first and second sides, said piston member being movably coupled to one of said first and second rotary members to selectively engage and disengage said first side of said piston member with said clutch engaging member to selectively engage and disengage said first and second friction members; and a hydraulic chamber structural member movably coupled relative to said piston member, said second side of said piston member and said hydraulic chamber structural member forming therebetween a first hydraulic chamber for receiving hydraulic oil and a second hydraulic chamber fluidly connected to said first hydraulic chamber via a flow restriction member that permits a limited amount of hydraulic oil to pass therethrough, each of said piston member and said hydraulic chamber members having annular surfaces which are adjacent to each other, said first hydraulic chamber and said second hydraulic chamber being concentrically arranged annular spaces, which are divided by said annular surfaces, and said flow restriction member being an annular sealing member disposed between said annular surfaces for restricting flow of hydraulic oil from said first hydraulic chamber to said second hydraulic chamber.

9. The hydraulic actuating assembly according to claim 8, further comprising a first oil path formed in one of said piston member and said hydraulic chamber structural member, with said first oil path extending between said second hydraulic chamber and said exhaust port, an opening/closing member disposed in said first oil path and movable between an open position connecting said second hydraulic chamber and said exhaust port and a closed position disconnecting said second hydraulic chamber and said exhaust port, and an actuating mechanism acting on said opening/closing member to maintain said opening/closing member in said open position when said piston member moves from said hydraulic chamber structural member towards said clutch engaging member, and to maintain said opening/closing member in said closed position when said piston member contacts said clutch engaging member.

10. The hydraulic actuating assembly according to claim 8, further comprising a first oil path formed in one of said piston member and said hydraulic chamber structural member, with said first oil path extending between said second hydraulic chamber and said exhaust port, an opening/closing member disposed in said first oil path and movable between a first position connecting said second hydraulic chamber and said exhaust port and a second position for disconnecting said second hydraulic chamber and said exhaust port, a drive member holding said opening/closing member in said first position, and a second oil path in fluid communication with said first hydraulic chamber for moving said opening/closing member from said first position to said second position by hydraulic oil being supplied to said first hydraulic chamber to counteract said driving member.

11. A hydraulic actuating assembly, comprising:

a first rotary member adapted to be fixedly coupled to an input shaft;

a second rotary member adapted to be fixedly coupled to an output shaft, said first and second rotary members being rotatably coupled together;

a housing coupled to one of said first and second rotary members for rotation therewith, said housing including an exhaust port;

a clutch engaging member having a first friction member coupled to said first rotary member and a second friction member coupled to said second rotary member;

a piston member having first and second sides, said piston member being movably coupled to one of said first and second rotary members to selectively engage and disengage said first side of said piston member with said clutch engaging member to selectively engage and disengage said first and second friction members;

a hydraulic chamber structural member movably coupled relative to said piston member, said second side of said piston member and said hydraulic chamber structural member forming therebetween a first hydraulic chamber for receiving hydraulic oil and a second hydraulic chamber fluidly connected to said first hydraulic chamber via a flow restriction member that permits a limited amount of hydraulic oil to pass therethrough;

a first oil path formed in said piston member, with said first oil path extending between said second hydraulic chamber and said exhaust port;

an opening/closing member disposed in said first oil path and movable between an open position connecting said second hydraulic chamber and said exhaust port and a closed position disconnecting said second hydraulic chamber and said exhaust port; and an actuating mechanism acting on said opening/closing member to maintain said opening/closing member in said open position when said piston member moves from said hydraulic chamber structural member towards said clutch engaging member, and to maintain said opening/closing member in said closed position when said piston member contacts said clutch engaging member.

12. A hydraulic actuating assembly, comprising:

a first rotary member adapted to be fixedly coupled to an input shaft;

a second rotary member adapted to be fixedly coupled to an output shaft, said first and second rotary members being rotatably coupled together;

a housing coupled to one of said first and second rotary members for rotation therewith, said housing including an exhaust port;

a clutch engaging member having a first friction member coupled to said first rotary member and a second friction member coupled to said second rotary member;

a piston member having first and second sides, said piston member being movably coupled to one of said first and second rotary members to selectively engage and disengage said first side of said piston member with said clutch engaging member to selectively engage and disengage said first and second friction members;

a hydraulic chamber structural member movably coupled relative to said piston member, said second side of said piston member and said hydraulic chamber structural member forming therebetween a first hydraulic chamber for receiving hydraulic oil and a second hydraulic chamber fluidly connected to said first hydraulic chamber via a flow restriction member that permits a limited amount of hydraulic oil to pass therethrough;

a first oil path formed in one of said piston and structural members, said first oil path connecting said hydraulic chamber to the exhaust port;

an opening/closing member disposed in said first oil path and movable between a first position connecting said hydraulic chamber to the exhaust port and a second position disconnecting said hydraulic chamber from the exhaust port;

a drive member actuating on said opening/closing member to hold said opening/closing member in said first position; and a pressure differential generation mechanism generating a pressure difference on both sides of said opening/closing member when hydraulic oil is supplied to said hydraulic chamber for moving said opening/closing member from said first position to said second position to counteract said drive member, each of said piston member and said hydraulic chamber members has annular surfaces which are adjacent to each other, said first hydraulic chamber and said second hydraulic chamber being concentrically arranged annular spaces, which are divided by said annular surfaces, and said flow restriction member being an annular sealing member disposed between said annular surfaces for restricting flow of hydraulic oil from said first hydraulic chamber to said second hydraulic chamber.

* * * * *